May 27, 1941.   R. E. OLSON   2,243,356
SANITARY FITTING
Filed Aug. 14, 1939

INVENTOR.
RAYMOND E. OLSON
BY
D. Clyde Jones
ATTORNEY.

Patented May 27, 1941

2,243,356

UNITED STATES PATENT OFFICE 2,243,356

SANITARY FITTING

Raymond E. Olson, Pittsford, N. Y., assignor to Taylor Instrument Companies, Rochester, N. Y., a corporation of New York Application August 14, 1939, Serial No. 290,031

8 Claims. (Cl. 285—166)

This invention relates to sanitary fittings for use with industrial thermometers and more particularly to improvements in thermometer fittings disclosed in Patents Nos. 1,233,385, 1,609,606 and 1,890,006.

In the handling of milk, particularly in the pasteurization thereof, it is important that the fittings be readily disassembled for daily cleaning and, furthermore, that cracks and crevices be reduced to a minimum so that milk can not collect therein.

The object of the present invention is to provide a sanitary fitting which is readily assembled and disassembled for cleaning and yet will satisfy the extreme requirements of the various public health codes.

Figure 1:
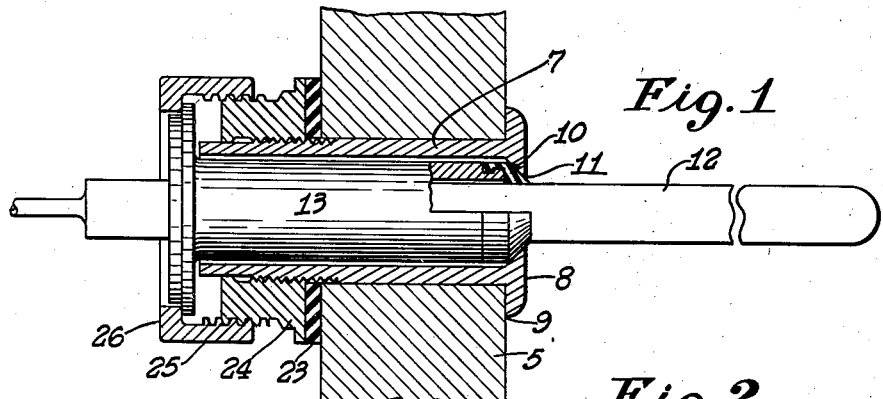
Figure 2:
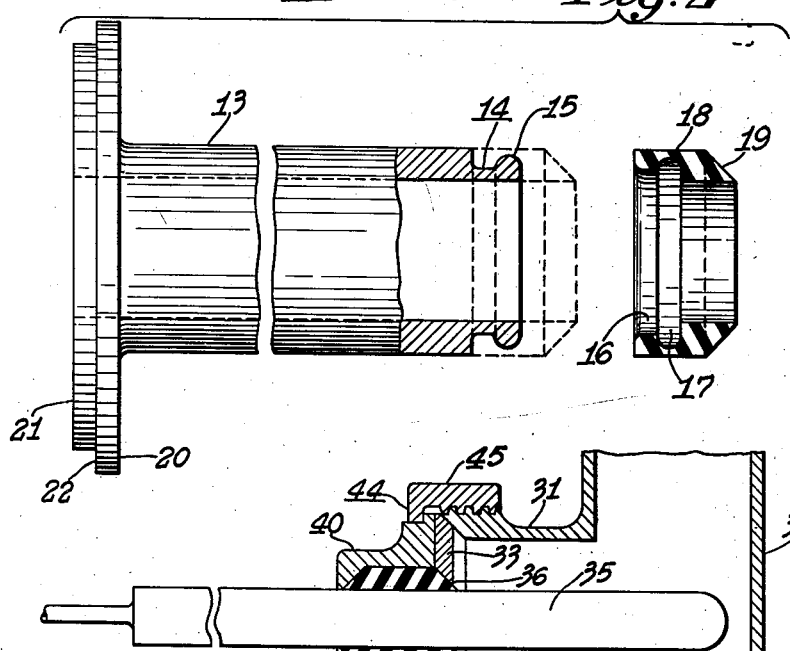
Figure 3:
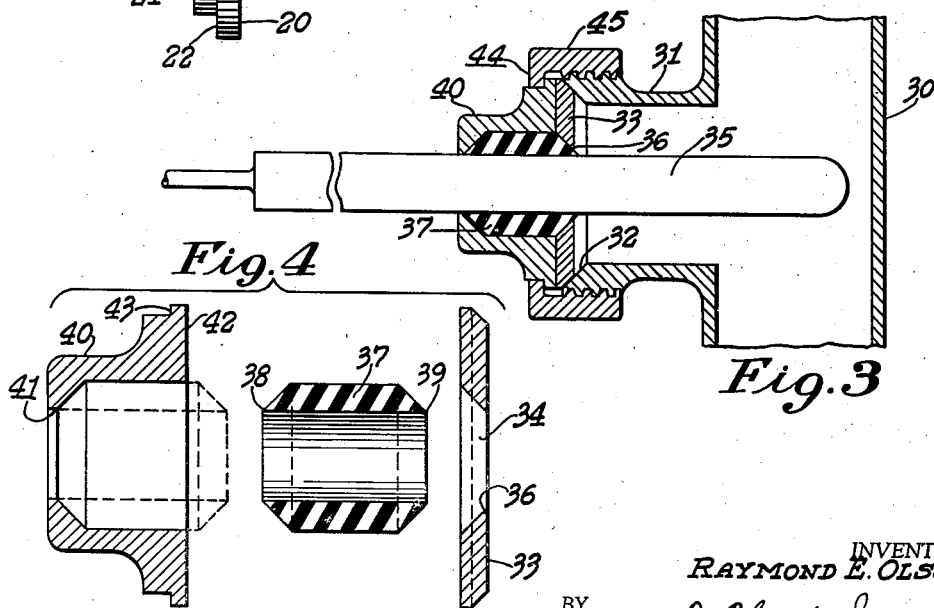
Figure 4:
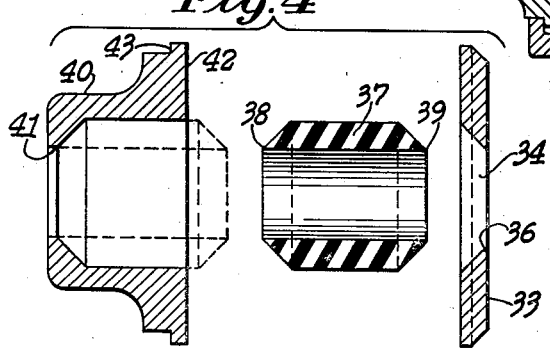

The various features and advantages of the invention will appear from the detailed description and claims when taken with the drawing in which Fig. 1 is a view partially in section showing a thermometer bulb and a fitting by which it is mounted in the wall of a vat or tank; Fig. 2 is an enlarged exploded view particularly in section of a sleeve and compression ring forming an essential part of the fitting shown in Fig. 1; Fig. 3 is a sectional view of a modified type of fitting suitable for use with a thermometer bulb to be introduced into a part of a pipe line; and Fig. 4 is an enlarged exploded view in section showing several of the important parts of this modified fitting.

Referring especially to Figs. 1 and 2, the numeral 5 designates a wall of a vat having an opening therein to receive a primary metal sleeve 7. This sleeve at the inner wall of the vat terminates in a flange or disc 8 having its outer edge 9 preferably soldered or welded to the inner surface of the wall 5 in order to provide a bacteria-proof joint between the sleeve and the vat wall. The inner portion of the disc adjacent its junction with sleeve, is formed into a conical seat 10 terminating in a relatively sharp edge 11. The opening defined by this edge is of such size that it makes a close fit with the metal bulb 12 of a thermometer to be received therethrough. The sleeve 7 and especially the conical seat 10 thereof cooperates with a secondary sleeve 13 which is adapted to telescope over the bulb 12 and to be received in the space between the outer surface of the bulb and the inner surface of the sleeve 7. The right-hand end of this secondary sleeve 13, as illustrated, is reduced in diameter and is provided with a groove 14 and a terminating bead 15. The mentioned groove and bead are adapted to interengage a complementary bead 16 and a groove 17 of a bushing 18 made of resilient material such as rubber. The outside and inside diameters of the bushing 18 and the secondary sleeve are the same, so that the bushing can be snapped on to the end of the sleeve to serve as an extension thereof. The right-hand end of the bushing as shown in Fig. 2 terminates in a conical valve surface 19 to cooperate with the conical seat 10 of the primary sleeve 7. The left end of the secondary sleeve 13 is provided with an integral apertured flange 20 having its principal plane at right angles to the principal axis of the secondary sleeve. This flange is provided with a part 21 of reduced diameter thereby affording a shoulder 22 for a purpose to be described. In normal practice the primary sleeve 7 is permanently mounted on the wall of the vat, its left-hand end, as shown in Fig. 1, being threaded to receive a washer 23 and a nut 24.

In assembling the thermometer in the vat, the thermometer bulb 12 is first inserted through the secondary sleeve 13 and its bushing 18 to project a desired amount. Thereafter the parts thus assembled are inserted into the primary sleeve 7 until the bushing 18 has its conical surface 19 in interengagement with the conical seat 10 of the primary sleeve.

It will be noted that the previously mentioned nut 24 is exteriorly threaded to cooperate with a clamping nut 25. This nut has an annular flange 26 adapted to engage the shoulder 22 on the flange 20 which is a part of the secondary sleeve. Thus when the nut 25 is tightened, the secondary sleeve is driven toward the right, as viewed in Fig. 1 until the reduced edge of the conical part of the bushing 18 is forced into the narrow space between the bulb 12 and the inner edge 11 of the disc 10. It will be appreciated that all of these parts can be readily disassembled for cleansing and sterilization and then can be reassembled quickly into a fitting which does not leak.

In Figs. 3 and 4 there is illustrated a modified form of fitting adapted for use in a pipe line having a T connection 30 therein. The T fitting 30 has a well-known extension 31 terminating in a conical valve seat 32 and being exteriorly threaded adjacent its end. The conical seat 32 is adapted to cooperate with a centrally apertured disc 33, the periphery of this disc being chamfered to provide a complementary conical surface with respect to the valve seat 32 with which it contacts in liquid-tight relation. The aperture 34 in the disc 33 is of a size to make a close fit with a thermometer bulb 35 so that the bulb may be inserted therethrough into the extension 31. The surface of the disc at its aperture 34 is tapered in the same direction as the taper of the valve seat 32 and terminates in a relatively sharp edge 36 adjacent the bulb. An apertured bushing 37 of resilient material is conically tapered at each end thereof, preferably terminating in relatively sharp edges 38 and 39. One end of this bushing is adapted to engage the tapered face of the aperture through the disc 33. A cap 40 has an aperture 41 therethrough, of a size to conveniently receive the thermometer bulb 35. However, the cap provides a relatively large space therein to house the resilient bushing 37. The open end 42 of the cap is of approximately the same diameter as the greatest diameter of the disc 33. The cap is made with an external shoulder 43 adapted to be engaged by the flange 44 on the clamping nut 45 which is internally threaded to engage the externally threaded portion of the extension 31 of the T.

In assembling the fitting into a pipe line, the free end of the thermometer bulb 35 is first inserted through the clamping nut 45, then through the cap 40 and the bushing 37 and finally through the disc 33. Since the bushing is slightly larger than the interspace formed by the cap 40 an the disc 33 (Fig. 4), when the clamping nut 45 is tightened, its flange 44 engages the shoulder 43 on the cap and compresses the flexible bushing into the space between the cap and the disc. When the bushing is compressed in this manner, the reduced edge 39 of the bushing 37 is forced into the narrow space between the bulb 35 and the inner edge 36 of the disc 33 to provide a leak-proof joint. The parts can be readily disassembled for cleansing and sterilization and then reassembled quickly in the manner just described to provide a fitting which does not leak.

While the fitting has been shown in cooperation with a metallic bulb 12 of a thermo-sensitive tube system, it will be understood that the present fitting is equally adaptable for use with a metal well of the conventional type for use with all glass thermometers.

I claim:

1. A fitting for a thermometer bulb or the like, comprising an annular member, the aperture therethrough being adapted to receive the bulb, the diameter of said aperture being slightly larger than the diameter of said bulb, the wall of said annular member at said aperture forming a conical seat sloping toward said bulb, a bushing of resilient material through which said bulb passes, said bushing having a conical end portion terminating in a relatively sharp edge, said end portion mating with said conical seat, and means for forcing said bushing toward said annular member whereby said edge of the bushing is extruded through the space between the bulb and the annular member.

2. A fitting for a thermometer bulb or the like, comprising a sleeve having an apertured disc at one end to receive the bulb, the diameter of the aperture in said disc being slightly larger than the diameter of said bulb, the wall of said disc at the aperture forming a conical seat sloping toward the bulb, a second sleeve mounted in said first sleeve and telescoped on said bulb, a bushing of resilient material engaging the end of said second sleeve, said bushing having a conical end portion mating with the said conical seat, and means for forcing said sleeve and bushing toward said disc whereby a portion of said bushing is extruded between the space between the bulb and the disc.

3. A fitting for a thermometer bulb or the like, comprising a disc having an aperture therethrough to receive the bulb, the diameter of said aperture being slightly larger than the diameter of said bulb, the wall of said disc at said aperture forming a conical seat sloping toward said bulb, a cap having a chamber therein of substantially greater diameter than the diameter of said bulb, a bushing of resilient material through which said bulb passes, seated in said chamber, said bushing being of greater length than the depth of said chamber whereby a portion of said bushing projects beyond said cap, the projecting portion of said bushing having a conical end portion terminating in a relatively sharp edge, said end portion mating with the conical seat of said disc, and means for forcing said cap toward said disc whereby said edge of the bushing is extruded through the space between the bulb and the disc.

4. The combination with a receptacle wall having an aperture and a tubular sleeve fitting the aperture, said sleeve having an annular conical seat at its inner end, of a thermometer bulb or the like adapted to project through said sleeve into the receptacle, a second sleeve telescoped on said bulb and disposed within said first-mentioned sleeve, a bushing of resilient material engaging the inner end of said second sleeve and having a conical surface for mating with said conical seat, and means for forcing said second sleeve toward said annular seat to extrude a portion of said bushing into the space between said bulb and the conical seat.

5. A fitting for a thermometer bulb or the like, comprising a disc having an aperture therethrough to receive the bulb, said aperture being slightly larger than said bulb, the wall of said disc at said aperture providing a conical seat, a sleeve telescoped on said bulb, a bushing of resilient material secured to one end of said sleeve and provided with a conical surface for mating with said conical seat, and means for forcing said sleeve and bushing toward said disc whereby said bushing is extruded through the space between said bulb and said disc.

6. In combination with a pipe section having an end portion provided with an internal conical seat, an apertured disc having a beveled edge for engagement in said seat, a thermometer bulb or the like adapted to extend through the aperture in said disc, the wall of said disc at said aperture providing a conical seat, a cap member slidable on said bulb and having a chamber therein, a tubular bushing of greater length than the depth of said chamber, encircling said bulb and disposed in said chamber, a portion of the bushing projecting out of said cap, the projecting portion of said bushing terminating in a conical surface for mating with said conical seat in said disc and means for clamping said cap to said disc whereby a portion of said bushing is extruded through the aperture in said disc.

7. In a fitting for a thermometer bulb or the like, a sleeve having a bore therethrough to receive the bulb or the like, said sleeve being provided with a circumferential groove spaced from the end thereof and a tubular bushing of resilient material having a portion adjacent one end thereof complementary to said groove whereby said bushing may be snapped on to said end portion of the sleeve, the other end of said bushing having a conical surface.

8. A fitting for a thermometer bulb or the like comprising a sleeve having an apertured disc at one end thereof, the wall of said disc at said aperture providing a conical seat, the diameter of said aperture being slightly larger than the diameter of the bulb, a second sleeve telescoped within said first-mentioned sleeve, said sleeve having a bushing secured at one end thereof, said bushing being provided with a conical surface for mating with said conical seat, the other end of said second sleeve having an annular shoulder thereon and means engaging said shoulder for forcing said sleeve and bushing toward said conical seat whereby said bushing will be extruded through the aperture in said disc around said bulb.

RAYMOND E. OLSON.